UNITED STATES PATENT OFFICE.

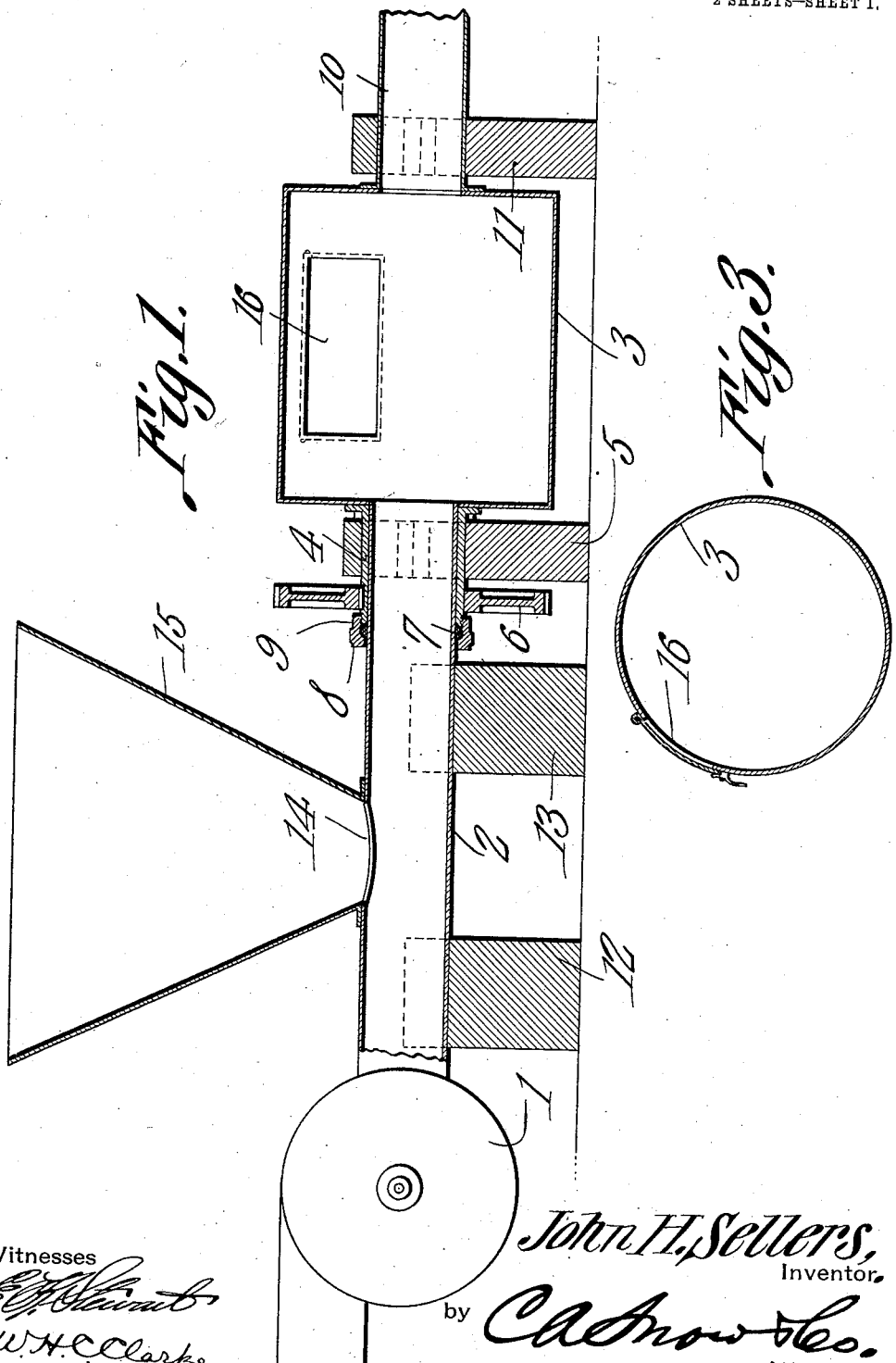

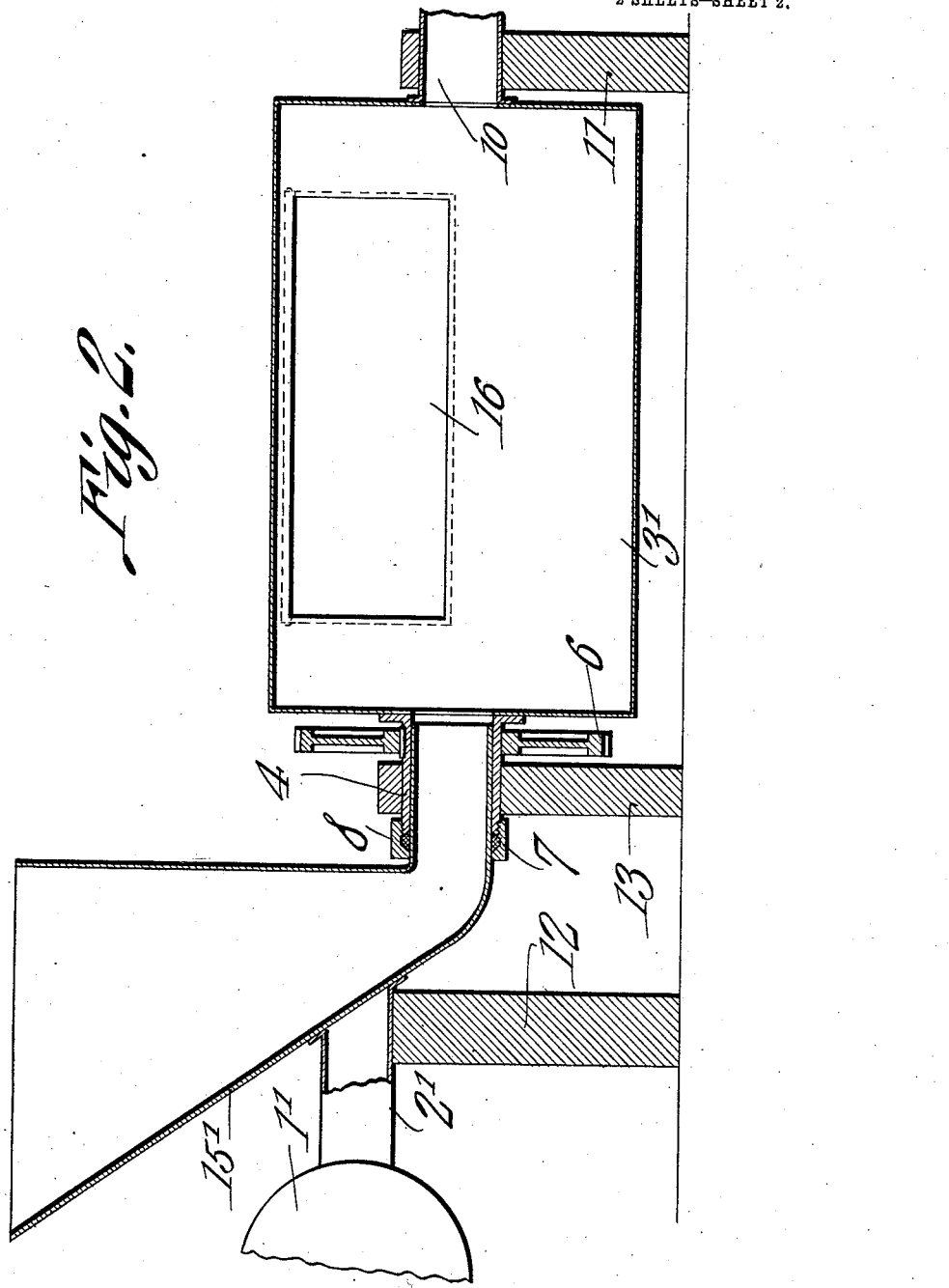

JOHN H. SELLERS, OF WELLSTON, OHIO.

WATER CINDER-MILL.

1,053,444.

Specification of Letters Patent. Patented Feb. 18, 1913.

Application filed April 2, 1910. Serial No. 553,041.

*To all whom it may concern:*

Be it known that I, JOHN H. SELLERS, a citizen of the United States, residing at Wellston, in the county of Jackson and State of Ohio, have invented a new and useful Water Cinder-Mill, of which the following is a specification.

This invention relates to water cinder mills of the class used more particularly for cleaning and separating metallic soils such as the droppings or cinders of a cupola.

Cinder mills or apparatus for washing placer soil, as usually constructed, consist of a hollow rotor or drum having a peripheral door or opening therein through which the cinder soil is fed. The water or other liquid for washing and separating the soil is usually supplied to the rotor or drum through a pipe which is axially arranged with respect to the drum and usually serves as one of the journals thereof. The deficiency of this type of apparatus is that when it is desired to load the drum or to discharge the contents thereof, it is necessary to stop the operation of the apparatus, and valuable time is lost in this way.

The principal object of the present invention is to utilize the hollow shafting, journal or trunnion of the rotor as a means, not only of supplying the liquid, but of also feeding the soil, whereby the apparatus will be rendered practically self-acting and continuous in its operation, it being only necessary to stop the machine at distant intervals for the purpose of removing the separated product.

With the foregoing and other objects in view which will appear as the description proceeds, the invention resides in the combination and arrangement of parts and in the details of construction hereinafter described and claimed.

In the accompanying drawing forming a part of this specification,—Figure 1 is a longitudinal vertical section through a cinder mill constructed in accordance with the invention. Fig. 2 is a similar view showing a modified form of the device. Fig. 3 is a transverse sectional view of the drum.

Like reference numerals indicate corresponding parts in the different figures of the drawing.

Briefly outlined, the apparatus of the present invention comprises a rotor or drum which is operated in any suitable manner and is provided with a suitable source of water or liquid supply which is fed to the drum usually through one of the bearings thereof. Means are provided intermediate the source of liquid supply and the drum or rotor for feeding the placer soil or other material to be acted upon into the body of liquid before it reaches the drum, whereby the liquid serves as a medium for conveying or feeding the soil to the rotor.

Referring to the drawings 1 indicates the source of liquid supply, which in the embodiment of the invention illustrated consists of a centrifugal pump. It is to be understood, however, that the water or other liquid may be fed to the apparatus in any other suitable manner, such as by gravity or other power. The centrifugal pump 1 communicates with a pipe or conduit 2 which constitutes means for conveying the liquid from the pump 1 to the hollow rotor or drum 3. The drum 3 is provided with a trunnion or tubular extension 4 which annularly surrounds the end of the conduit 2 and is interposed between said conduit and a bearing or support 5 which serves as a journal for the drum 3. Fixed on the trunnion 4 in any suitable manner is a gear wheel 6 by means of which the drum or rotor 3 is rotated to effect the separation of the substances held in suspension in the liquid therein. For the purpose of preventing leakage between the trunnion 4 and the end of the conduit 2, a packing ring 7 is employed, which is held in place in compressed condition preferably by means of the ring 8 having an annular extension 9 which engages or telescopes upon the ends of the trunnion 4 as shown, the gear wheel 6 being fixed in said trunnion 4 intermediate the extension 9 and the bearing 5. The opposite end of the rotor or drum 3 is provided with a tubular extension or trunnion 10 which is journaled in a support or bearing 11.

The conduit 2 is supported intermediate the pump 1 and drum 3 by means of the uprights or standards 12—13 which may be of any suitable form and construction. Intermediate the standards 12 and 13, the conduit 2 is formed preferably in the upper portion thereof with an opening or inlet 14 which is in communication with the lower end of an approximately conical hopper or trough 15 which is adapted to receive the soil or other material to be acted upon by the apparatus.

The drum 3 is provided in the periphery thereof with a door 16 by means of which the contents of said drum may be removed from time to time after the separation of the material has been completely effected.

Constructed as described, the operation of the device is as follows:—The water or other liquid is fed from the pump or other source of supply 1 through the conduit 2 to the drum 3 which is maintained in rotation. The soil or other substance to be washed or separated is fed into the hopper 15. The passage of the liquid past the opening 14 at the lower end of the hopper 15 serves to draw the soil from the hopper 15 and conduct it in a practically continuous manner to the drum 3. The rotation of the drum serves to separate the heavier particles in the soil, the lighter particles of which pass on through the trunnion 10. From time to time when a sufficient quantity of the material to be conserved is separated, the drum 3 is opened by means of the door 16 and the valuable contents thereof removed.

The modified construction illustrated in Fig. 2 is the same in principle as that shown in Fig. 1 and very slightly different in construction. The conduit 2' which carries the liquid from the source of supply 1' to the rotor 3' passes into and through the bottom of the hopper 15' so that the lower portion of said hopper forms, in effect, a part of the means for conducting the liquid from the source of supply to the rotor. In this case the liquid serves as a means of softening and feeding the soil in the lower portion of the hopper, to a greater extent, perhaps, than the construction illustrated in Fig. 1. The operation of the device is otherwise the same as that previously described.

The cinder mill of the present invention is strong, simple, durable and inexpensive in construction as well as thoroughly efficient, economical, and practical in operation.

It is to be understood that the device of the present invention can be used not only for the droppings or soil of a cupola but any other soil in which there is iron, brass, copper or any other metal. It can be used to advantage around blast furnaces where the iron gets mixed with the sand, thus resulting usually in the loss of the same when the sand is hauled away. Moreover the cinder mill may be operated not only from the trunnions as shown, but in any other desired manner.

Having thus described the invention, what is claimed as new is:—

A cinder mill including a rotatable drum, substantially horizontally alined inlet and outlet conduits, a hopper adapted to deliver directly into the inlet conduit, and means for forcibly projecting a current of water past the hopper outlet, through the inlet conduit, drum and outlet conduit, the drum being closed except to the inlet and outlet conduits and having an unobstructed interior between the conduits.

In testimony that I claim the foregoing as my own, I have hereto affixed my signature in the presence of two witnesses.

JOHN H. SELLERS.

Witnesses:
T. R. JONES,
A. E. SHATTUCK.

---

Copies of this patent may be obtained for five cents each, by addressing the "Commissioner of Patents, Washington, D. C."